United States Patent [19]

Filicicchia

[11] Patent Number: 4,738,401

[45] Date of Patent: Apr. 19, 1988

[54] QUICK DISCONNECT NOZZLE ASSEMBLY WITH TWIST-ON SPRAY TIP

[75] Inventor: Daniel J. Filicicchia, Batavia, Ill.

[73] Assignee: Spraying Systems Co., Wheaton, Ill.

[21] Appl. No.: 17,871

[22] Filed: Feb. 24, 1987

[51] Int. Cl.$^4$ .................................................. B05B 1/00

[52] U.S. Cl. ..................................... 239/600; 239/487; 285/360; 285/376

[58] Field of Search ................ 239/600, 487; 285/360, 285/376, 396, 401

[56] References Cited

U.S. PATENT DOCUMENTS

| | | | |
|---|---|---|---|
| 4,185,781 | 1/1980 | O'Brien | 285/376 |
| 4,438,884 | 3/1984 | O'Brien et al. | 239/600 |
| 4,527,745 | 7/1985 | Butterfield et al. | 285/376 |

*Primary Examiner*—Andres Kashnikow
*Assistant Examiner*—Karen B. Merritt
*Attorney, Agent, or Firm*—Leydig, Voit & Mayer

[57] ABSTRACT

A quick disconnect nozzle assembly having a nozzle body, an annular sealing member and a nozzle tip with a socket in the body for receiving the tip and having a pair of chord-like lugs with upstream facing camming surfaces for engaging downstream facing camming recesses in a pair of radially extending shoulders on the nozzle tip to cam the tip axially into sealing engagement with the annular sealing member as the nozzle tip is inserted in the socket and rotated therein. Preferably the socket includes diametrically opposed lugs and the tip has a pair of cooperating shoulders and recesses and at least one radially extending stop adapted to engage an abutment in the base of the socket when the tip is rotated into proper position. The tip may include a swirl imparting vane and have an outer protective sleeve with longitudinal ribs to facilitate rotating the tip by hand.

10 Claims, 2 Drawing Sheets

QUICK DISCONNECT NOZZLE ASSEMBLY WITH TWIST-ON SPRAY TIP

FIELD OF THE INVENTION

The present invention relates generally to spray nozzle assemblies, and more particularly, concerns spray nozzle assemblies of a type which have quick disconnect means for permitting disassembly of the nozzle for replacement of the nozzle tip or for cleaning.

BACKGROUND OF THE INVENTION

It is often necessary to remove and/or change the tip of a spray nozzle for various reasons, such as inspection of the parts and cleaning if required because of stoppage, or clogging, or any other type of blockage. The nozzle tip may be replaced, or a different type substituted for a different type of spraying operation.

The usual threaded type connection utilized with spraying apparatus between a nozzle body and a spraying tip is subject to obvious limitations. When a non-axial spray direction is used, the threaded connection requires adjustment of the direction each time the nozzle is removed. Some spraying apparatus is not stationary and this requires that tools be provided at all of the various locations where the apparatus may be used, or otherwise transported with the apparatus to the site. Just the operation of removing and reapplying a threaded connection is unduly time-consuming, especially where the spraying apparatus may have multiple nozzles.

In the past, quick disconnect nozzles have been provided such as U.S. Pat. No. 4,185,781 wherein a separate seal member was provided and a separate pressure-applying spring also included. In other types of prior nozzles, additional parts were required in order to couple the nozzle tip with the nozzle body, and such coupling components resulted in a significant loss of time just in handling the multiple parts, and especially where, as often happened, some of the parts may have been lost, or misplaced during disassembly, or as the parts were attempted to be reassembled. These problems were especially acute where the spraying apparatus was of the mobile type. Some quick disconnect nozzles relied upon frictional engagement of the spray tip with the nozzle body and this necessitated very precise machining, or molding tolerances in the manufacture of such parts. This type of engagement was also undesirable for non-axial spraying directions inasmuch as the spray tip had to be adjusted for the proper direction each time such nozzles were assembled, or disassembled.

More recently, U.S. Pat. No. 4,438,884 discloses a quick disconnect spray nozzle comprised of a spray tip and a nozzle body and a combination seal and pressure exerting member between the body and the nozzle tip. The combination pressure exerting seal member is resilient and is mounted in the nozzle body concentric with the nozzle bore and when the nozzle tip is mounted in the body, a sealing ring on the tip abuts an end of the seal member around the bore, thus providing a seal between the parts and also compressing the seal member, whereby pressure is applied between the nozzle body and the tip to maintain the locked condition of the tip in the body.

The combination member thus eliminates any need for a separate spring and a separate sealing member and the single member functions both as a seal and as a spring, or pressure-exerting member, to provide substantial advantages over earlier nozzles using the separate spring and separate seal. In addition to acting as a seal between the nozzle body and the spray tip the present sealing member acts also to seal the assembly against the entry of contaminants such as sand or other abrasive materials between the tip and the body housing which would cause excessive wear and possibly destroy the sealing properties of the seal member.

Quick disconnect nozzles of the type shown in U.S. Pat. No. 4,438,884, assigned to the same assignee as the present application, are commonly used for agricultural purposes. Large numbers of such nozzles are mounted on a common spray boom. Such nozzle assemblies may also have a spray tip retaining cap which is positioned onto a nozzle body. A sealing member interposed between the cap and body serves to provide a fluid-tight seal between the two members and to bias the cap in its assembled condition. In assembling the cap, it is commonly necessary to force the cap against the biasing force of the sealing member and then twist the cap into an assembled or locked position. Because of the location of the nozzles on the boom, and the multiplicity of such nozzles, it can be cumbersome, difficult, and tiresome to disconnect and reassemble large numbers of such nozzles.

In addition, after removal of the nozzle caps and spray tips from the nozzle assembly, it often is desirable to direct pressurized fluid through the nozzles in order to clean and flush out any contaminates that have accumulated. With the cap and spray tip removed, however, such flushing with pressurized liquid frequently causes the sealing members to be dislodged and to be forcibly ejected from the nozzle body, making it necessary to locate the sealing members and then replace them. In addition, if the nozzle bodies include vanes for imparting whirling motion to the discharge spray, it frequently is necessary to disassemble the vane from the nozzle in order to permit effective cleaning, and heretofore, this also has been tedious and cumbersome.

Moreover, in many instances it is important that the quick disconnect nozzle be reassembled with the nozzle tip in predetermined angular orientation. Because of the awkwardness and force required in overcoming biasing forces of sealing members and springs, and because of the awkwardness in the location of the spray nozzle assembly on the boom, problems have also occured in reassembling the nozzle tip with the prior orientation.

OBJECTS AND SUMMARY OF THE INVENTION

It is an object of the present invention to provide a quick disconnect nozzle assembly which permits easier removal and replacement of the removable spray tip.

Another object is to provide a spray nozzle assembly as characterized above which permits a spray tip to be removed and replaced with a simple twisting action, and without the necessity for exerting manual axial force to overcome the force of biasing springs, seals of the like.

A further object is to provide a quick disconnect nozzle of the above kind which is adapted for easy replacement of the spray tip in predetermined angular relation to the nozzle body.

A related object is to provide such a spray nozzle assembly with means for positively locating the spray tip in predetermined angular position relative to the nozzle body upon replacement, and for preventing twisting of the spray tip or holding cap beyond such location.

Still another object is to provide a quick disconnect spray nozzle assembly of the above kind in which the nozzle may be flushed following removal of the spray tip and cap without unwanted dislodging or discharge of the sealing and biasing member.

Yet another object is to provide a spray nozzle assembly of the foregoing type which includes a whirl imparting vane that is easily removable and replaceable during cleaning of the nozzle assembly.

Other objects and advantages of the invention will be more readily apparent upon reading the following detailed description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DESCRIPTION OF THE PREFERRED EMBODIMENT

Figure 3:
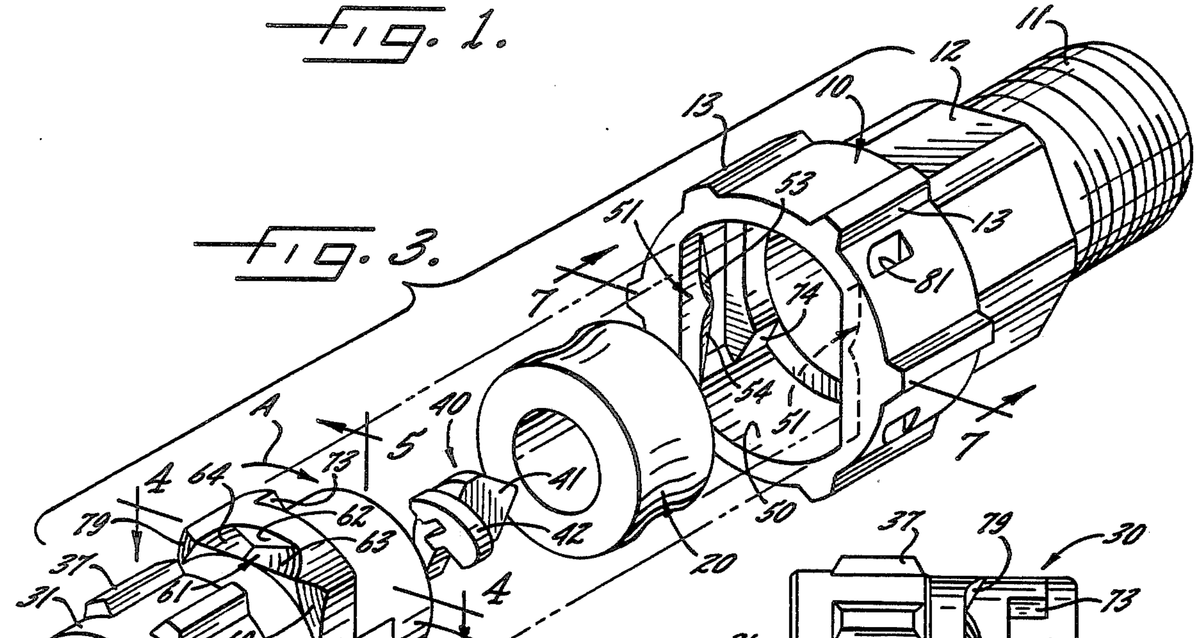
FIG. 3 is an exploded perspective view of the assembly showing the nozzle body, the sealing member, the swirl vane and the nozzle tip disposed in separated axial alignment.
Figure 4:
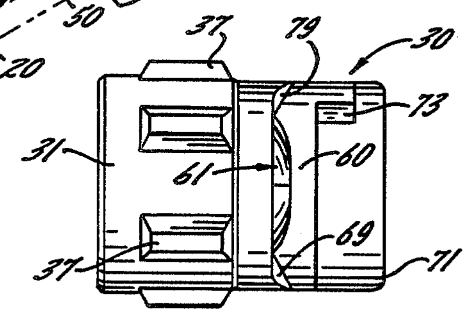
FIG. 4 is a top plan view of the nozzle tip as seen along line 4—4 in FIG. 3.

Turning now to the drawings, and particularly to the exploded view of FIG. 3, the principal parts of the quick disconnect nozzle assembly of the present invention are shown. The nozzle assembly includes a nozzle body 10, a combination seal and pressure exerting member 20, a spray nozzle tip 30, and an optional swirl imparting vane 40.

The nozzle body 10 is threaded at 11 for connection to a suitable source of spray fluid and a hexagonal portion 12 enables a suitable wrench to be applied to tighten this connection, as required. The exterior of the body 10 also is provided with a plurality of longitudinally extending ribs 13 which facilitate tightening and loosening the nozzle body 10 from its fluid source connection by hand.

Figure 1:
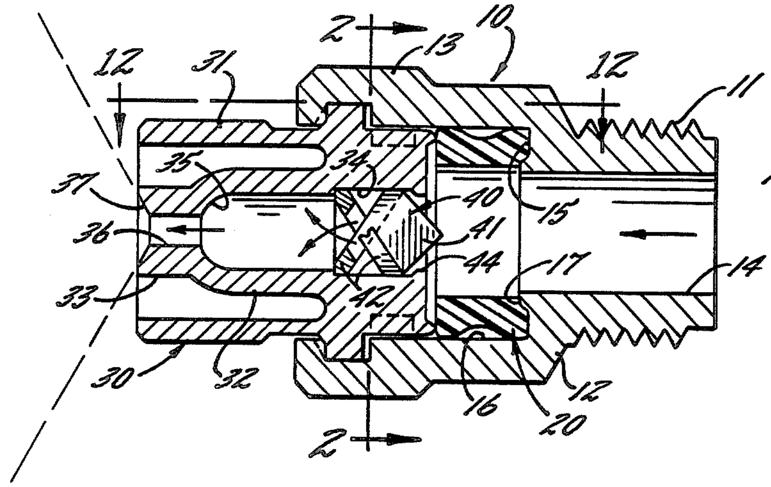
FIG. 1 is a longitudinal cross section of the quick disconnect nozzle assembly of the present invention.
Figure 8:
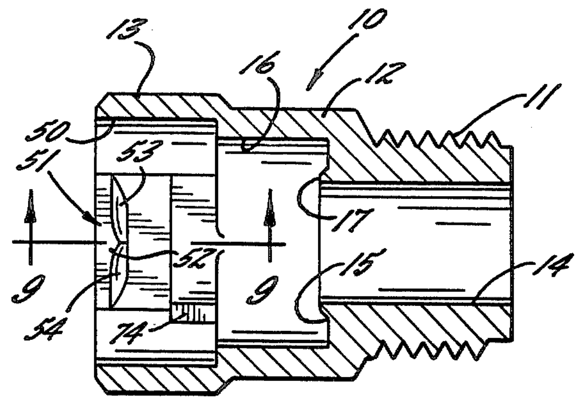
FIG. 8 is a longitudinal cross section of the nozzle body as seen along line 8—8 in FIG. 7.
Figure 12:
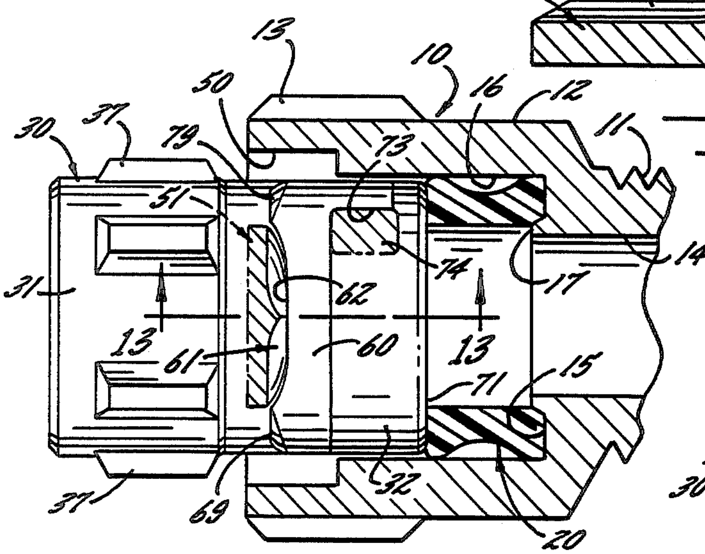
FIG. 12 is an enlarged side elevation, partly in section, similar to FIG. 1, showing the assembled nozzle tip and body and the engagement of the cooperating camming surfaces; and, FIG. 13 is a fragmentary cross section through the cooperating cams on the nozzle tip and body as seen along line 13—13 of FIG. 12.

The interior of the nozzle body is provided with a fluid passageway defined by a stepped, internal bore having a reduced fluid flow portion 14, a radial shoulder or seat 15 and an enlarged annular chamber 16 for receiving the combination seal and pressure exerting member 30. In the preferred embodiment, and as best seen in FIGS. 1, 8 and 12, the nozzle body is provided with an annular, axially extending lip 17 at the juncture of the flow passageway portion 14 and the seal seat 15.

In the preferred embodiment, the combination seal and pressure exerting member 20 is generally tubular in shape and is made of a suitable chemical resistant elastomeric material. As illustrated, the seal has a somewhat reduced outer diameter midway between its ends and the somewhat larger outer diameter of the end portions are dimensional to provide a snug fit within the annular chamber 16 of the nozzle body 10.

Pursuant to one feature of the present invention, the inner diameter of the sealing member 20 is slightly larger than the diameter of the fluid passage portion 14 and the upstream end of the seal member 20 engages the seat 15 radially outwardly of the outer face of the axially extending lip 17. The combination of the snug fit of the seal member 20 in the chamber 16, the engagement with the seat outwardly of the lip 17 and the enlarged inner diameter of the seal with respect to the fluid passage portion 14 cooperate in such a way as to diminish the tendency of fluid flow through the passageway such as during flushing or cleaning to eject the seal member 20 from the chamber 16 even if the spray tip 30 has been removed from the nozzle body 10.

The spray tip 30 includes an external protective shell 31 which extends axially from a connecting base 32 and surrounds an inner conduit portion 33 defining a stepped internal bore having an enlarged chamber 34, an intermediate flow passage 35 and a smaller spray orifice 36. Desirably, the spray orifice 36 is provided with a diverging outlet end 37 which produces a generally conical spray pattern as schematically indicated by dash lines in FIG. 1.

Figure 2:
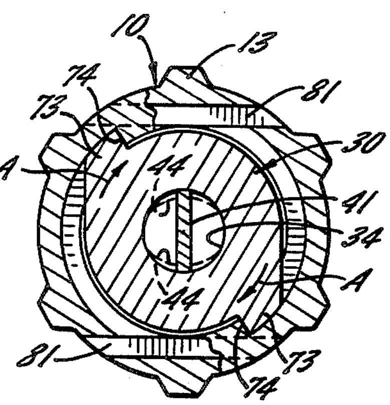
FIG. 2 is a cross section of the assembly substantially as seen along line 2—2 in FIG. 1.

In accordance with another feature of the invention, the spray nozzle assembly includes a swirl imparting vane 40 in the chamber 34 which facilitates final mixing of the spray fluid in the passage 35 and also generates a uniform discharge through the orifice 36. As best seen in FIGS. 1-3, the swirl vane 40 includes an upstream flow divider web 41 and a pair of integrally formed semi-helical deflectors 42 located downstream thereof. It will be understood that the deflectors 42 impart a swirl-like motion to the spray fluid causing it to rotate in a clockwise direction, as seen looking in the downstream direction.

In order to retain the swirl vane 40 in the chamber 34 and prevent accidental dislodgment therefrom, the chamber 34 is preferably formed with a pair of diametrically opposed arcuate lips 44 at the upstream end thereof. Each lip 44 may extend from about 90° to 120° around the circumference of the chamber and due to the helical configuration of the deflectors 42, the swirl vane may be simply screwed into the chamber 34 as the deflectors 42 engage and move past the ends of the lips 44 as the vane is literally screwed into the chamber 34.

Pursuant to a primary feature of the present invention, the nozzle body 10 and nozzle tip 30 are provided with cooperating camming surfaces for securely locking the tip in the body in proper angular orientation and without requiring the exertion of substantial axial pressure on the tip to insert and rotatably connect the tip to the body. Thus, the nozzle tip 30 may be simply inserted into the nozzle body 10 and rotated by hand to effectuate a properly oriented and fluid tight connection. To facilitate turning the nozzle tip 30, it is desirably provided with a plurality of longitudinally extending ribs 37 on the outer protective shell 31, which may be conveniently gripped between the installers finger and thumb.

Figure 9:
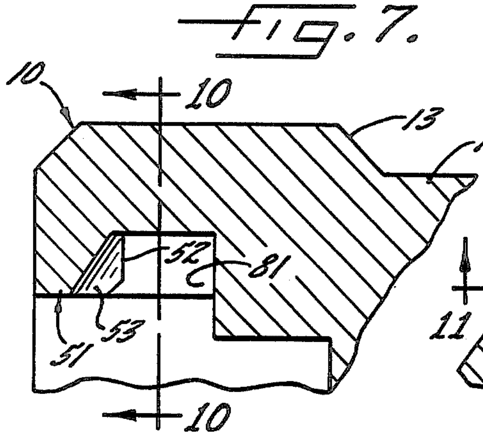
FIGS. 9, 10 and 11 are enlarged, fragmentary cross sections of a portion of the nozzle body including the locking cam as seen along lines 9—9, 10—10 and 11—11 in FIGS. 8, 9 and 10, respectively.
Figure 10:
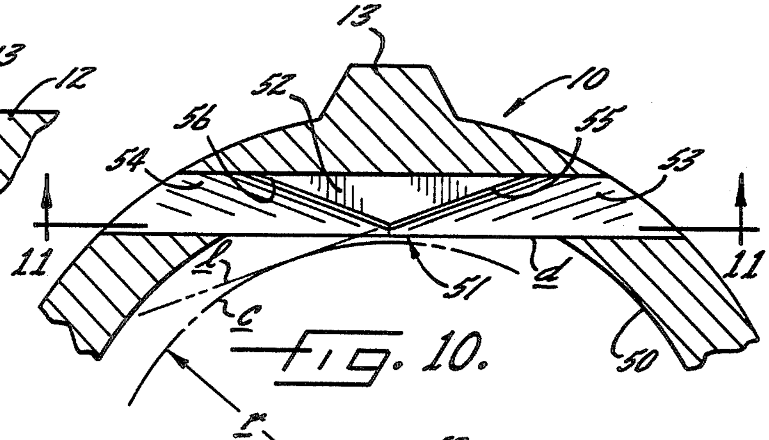
Figure 11:
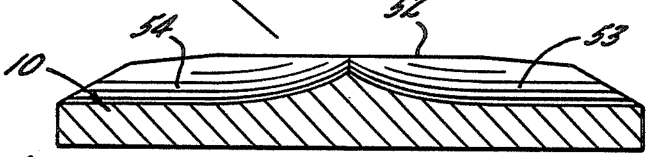

To receive the nozzle tip 30, the downstream end of the nozzle body 10 is provided with a generally cylindrical socket portion 50 having a pair of diametrically opposed, locating and locking lugs 51, extending in chord-like fashion across the outer end of socket 50. As best seen in FIGS. 9–11, the upstream face of each locking lug 51 includes a radially extending, generally triangular flat portion 52 and a pair of generally helically curved sloping ramps 53 and 54 extending outward from the legs 55, 56 of the triangular portion 52 and extend in chord-like fashion to the outer surface of the socket 50.

In the preferred embodiment and referring particularly to FIGS. 10 and 11, each of the sloping ramps 53, 54 is formed on a surface generated by moving a line l tangent to a circle c having a radius r from the nozzle body axis as the tangent line is swept, for example clockwise as seen in FIG. 10, from a first position coinciding with one leg 55 of the triangle 52 to a chordal position d as the line is maintained tangent to the circle.

Figure 13:
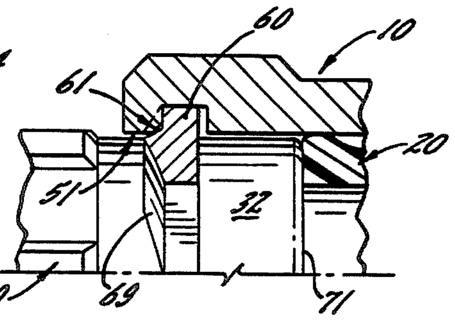

Cooperating with the lugs 51, the base 32 of the nozzle 30 is provided with a pair of radially extending, diametrically opposed shoulders 60, each of which defines a cam recess 61 having a triangular base 62 joined to sloping cam surfaces 63 and 64, which are generated in the same fashion as the cam surfaces 53 and 54 and thus are complementary thereto and provide essentially surface-to-surface contact when they are respectively engaged. (See FIGS. 12 and 13.)

Figure 6:
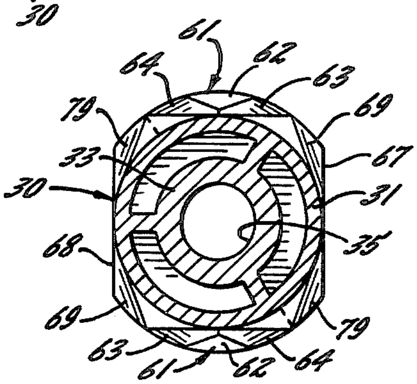
FIG. 6 is a cross section of the nozzle tip as seen along line 6—6 in FIG. 5.
Figure 5:
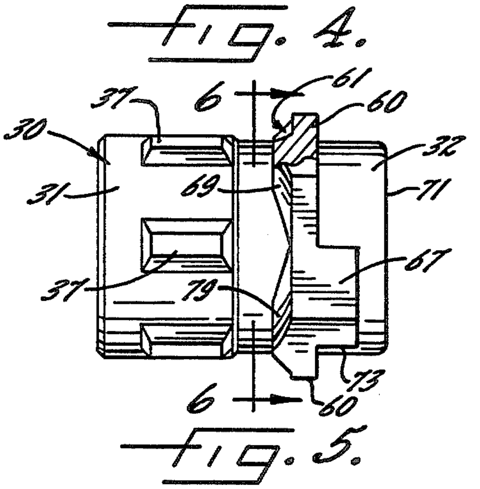
FIG. 5 is a side elevational view of the nozzle tip as seen along line 5—5 in FIG. 3.
Figure 7:
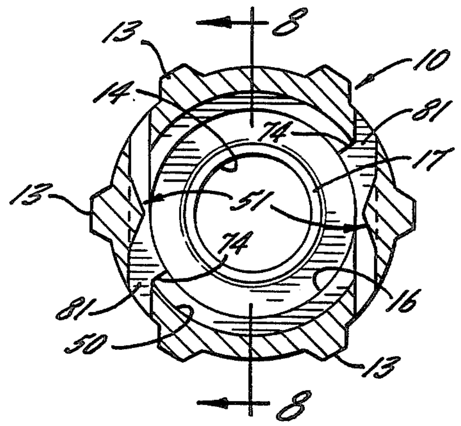
FIG. 7 is a cross-section of the nozzle body as seen along line 7—7 in FIG. 3.

As shown in FIGS. 3 and 6, the base 32 of the nozzle 30 is formed with opposed flats 67 and 68 dimensioned for insertion between the chord-like locking lugs 51 in the nozzle base. Thus the nozzle tip can only be inserted in the socket 50 of the nozzle body 10 in one or the other of two angular positions 180° apart. After the tip is so inserted, from the position shown in FIG. 3, it is rotated in the direction of the arrows A.

To permit entry of the locking lugs 51 into the cam recesses 61, the shoulders 60 of the nozzle tip 30 are each provided with sloping lead ramps 69 which engage the sloping cam surfaces 53 of the locking lugs 51 as the nozzle tip 30 is manually rotated. This causes the base 32 of the nozzle tip 30 to move axially into the socket 50 and the cooperating cam surfaces 53, 54 and 63, 64 to mate with one another.

As the nozzle tip 30 is cammed axially into the socket 50 by engagement of the cooperating cam surfaces on the socket lugs 51 and the base shoulders 60, the upstream end of the nozzle tip 30 is pressed against the resilient seal member 20. Preferably, nozzle tip 30 is formed with an axially extending, annular sealing bead 71 which engages and seals tightly against the downstream end of the sealing member.

In the preferred embodiment and as illustrated in the drawings, the base 32 of the nozzle tip 30 is provided with a pair of radially extending stops 73 which limit the rotation of the tip 30 in the socket 50 by coming into engagement with a pair of abutments 74 located in the base of the socket 50. In this way, the seated portion of the nozzle tip 30 in the socket 50 can be precisely and positively determined. This is particularly desirable in those instances where the nozzle orifice 36 is not axially directed and it is desired to insure that the spray is properly directed when the nozzle tip is installed.

Alternatively, the nozzle tip 30 can be made without the stops 73 (or the stops can be removed) to permit rotation of the tip 30 in either the clockwise or counterclockwise direction after insertion into the socket 50 of the nozzle body. Accordingly the shoulders 60 on the nozzle base 32 are provided with a second pair of lead ramps 79 which first engage the locking lugs 51 in the socket 50 when the nozzle tip is inserted and rotated in a counterclockwise direction. Regardless of the direction of tip rotation, however, the shapes of the complementary cam surfaces on the tip shoulders 60 and socket lugs 51 provide a self-centering action when the cam surfaces are fully engaged. This insures proper orientation of the nozzle tip 30 even if the shoulder steps 73 are eliminated or removed.

In the preferred embodiment, the nozzle body 10 and nozzle tip 30 are both made of a chemical resistant plastic material such as polyvinylidene fluoride (PVDF) which may be injection-molded in high capacity production equipment. To facilitate formation of the complex sloping surfaces of the cam faces 53, 54 on the lugs 51, the nozzle body is designed with a plurality of openings 81 which permit the use of reciprocally mounted side action core members in the injection molding die cavity. It will be understood that after the nozzle body 10 is molded, the sliding core members are retracted so that the nozzle body can be ejected from the mold cavity.

I claim as my invention:

1. A quick disconnect nozzle assembly comprising, in combination, a nozzle body, an annular sealing member and a spray nozzle tip, said nozzle body having means at one end thereof for connection to a source of spray fluid and a socket portion at the other end for reception of said spray tip, said nozzle body and tip each having internal bores for the passage of fluid therethrough, said internal bore of said body including an enlarged chamber portion for receiving said annular sealing member, said socket having a plurality of chord-like lugs adjacent the downstream end thereof, each of said lugs having a generally radially extending triangular portion on the upstream face thereof with a sloping cam surface extending outwardly from at least one of the legs of said triangular portion to the outer wall of said socket portion in chord-like fashion, said nozzle tip having a spring spray orifice at one end and a base portion at the other, said base portion having a plurality of generally radially extending shoulders each having a cam recess formed in the downstream face thereof, said cam recess having a central seat portion corresponding to said triangular portion on said socket lug and a sloping cam surface corresponding to said cam surface on said socket lug, each of said shoulders having an entrance ramp adjacent said socket for engagement with said socket lug when said nozzle tip is inserted in said socket and rotated to cam said socket lug into said shoulder recess, said cooperting cam surfaces on said socket lugs and shoulder recesses causing said nozzle tip to move axially into said socket as said tip is rotated and to press the upstream end of said tip into sealing engagement with the downstream end of said annular sealing member.

2. A nozzle assembly as defined in claim 1 wherein said socket includes a pair of diametrically opposed chord-like lugs and said nozzles includes a pair of diametrically opposed shoulders having camming recesses therein for cooperating with the sloping cam surfaces on said lugs.

3. A nozzle assembly as defined in claim 1 wherein said socket includes at least one radially inwardly extending abutment in the base thereof and said nozzle tip includes a radially extending stop on the upstream end thereof, said stop and abutment adapted to engage one another to limit the rotation of said tip in said socket and to properly locate said socket lugs in said shoulder recesses.

4. A nozzle assembly as defined in claim 1 wherein said socket lugs include outwardly sloping cam surfaces extending in opposite directions from said triangular portion and said shoulder recesses include corresponding sloping cam surfaces extending outwardly from said central seat portion.

5. A nozzle assembly as defined in claim 1 wherein said sloping cam surface on said socket lug is generated by a line extending tangent to a circle having a radius from the axis of said nozzle body as the tangent line is moved from a position coincident with one of said triangular lugs to a position coincident to a chordal position along the inner face of said lug.

6. A nozzle assembly as defined in claim 1 wherein the inner diameter of said annular sealing member is larger than the diameter of said bore in said nozzle body and said chamber includes an axially extending annular lip adjacent said bore at the upstream end of said chamber.

7. A nozzle assembly as defined in claim 1 wherein said internal bore in said nozzle tip includes an enlarged chamber at the upstream end thereof and a swirl vane having at least one generally helical deflector is dimensioned for inserton in said chamber.

8. A nozzle assembly as defined in claim 7 wherein said swirl vane includes a central flow divider portion and a pair of semi-helical deflectors.

9. A nozzle assembly as defined in claim 8 wherein said enlarged nozzle chamber includes a pair of entrance lips at the upstream end thereof and said helical deflectors are dimensioned to engage said lips and screw into said chambers as said vane is rotated.

10. A nozzle assembly as defined in claim 1 wherein said nozzle tip is formed with an annular protective sleeve surrounding said inner fluid passage and said sleeve is provided with longitudinally extending ribs on the outer surface thereof.

* * * * *